March 10, 1964 E. Y. WEBB, JR 3,124,748
SECRET SIGNALLING SYSTEMS
Filed April 17, 1961 4 Sheets-Sheet 1

| POINT | FREQUENCY TABLE |
|---|---|
| A | V; 2V; 2X2C(=12,000); 2C,(=6000); (6+V); (6-V); 2(6-V); 2(6+V); (6+3V); (18+3V) |
| B | 6-V |
| C | 3; (6-V)+3 = 9-V; (3-V); (6-V) |
| D | 3-V; UNINTELLIGIBLE SPEECH |
| E | 3-V |
| F | 6; (3-V)+6 = 9-V; (3-V)-6 = (3+V) |
| G | (3+V) |
| H | 3; (3+V)+3 = (6+V); (3+V)-3 = V |
| I | V RECONSTRUCTED SPEECH |

INVENTOR
Edwin Y. Webb, Jr.
BY
Wilkinson, Mawhinney & Theibault
ATTORNEYS

INVENTOR
Edwin Y. Webb, Jr.
BY
Wilkinson, Mawhinney & Theibault
ATTORNEY

March 10, 1964 E. Y. WEBB, JR 3,124,748

SECRET SIGNALLING SYSTEMS

Filed April 17, 1961

4 Sheets-Sheet 3

CONTROL CIRCUIT UNIT I

INVENTOR
Edwin Y. Webb, Jr.

BY
Wilkinson, Mawhinney & Theibault
ATTORNEY

March 10, 1964 E. Y. WEBB, JR 3,124,748

SECRET SIGNALLING SYSTEMS

Filed April 17, 1961 4 Sheets-Sheet 4

INVENTOR
Edwin Y. Webb, Jr.
BY Wilkinson, Mawhinney & Theibault
ATTORNEY

United States Patent Office 3,124,748 Patented Mar. 10, 1964

3,124,748
SECRET SIGNALLING SYSTEMS

Edwin Y. Webb, Jr., 3145 Dumbarton Ave. NW., Washington, D.C.

Filed Apr. 17, 1961, Ser. No. 103,568
10 Claims. (Cl. 325—35)

The present invention relates to secret signalling systems, and is a continuation-in-part of my prior application Serial No. 854,457, filed November 20, 1959, now abandoned.

In general, secret signalling systems for voice transmission consist of means for redistributing the normal voice frequencies into bands or ranges of frequencies which are unintelligible while passing over the transmission channel. At the receiving end re-translation results in producing the original speech intelligence. Such systems are well known to the art.

The usual method for producing such a system is one wherein the speech band is modulated with a carrier frequency in a non-linear device which may be of the vacuum tube type or the oxide type. Assuming the voice band and carrier are connected to the input of such modulator, the following frequencies are among those produced in the output circuit:

$$V; C; (C+V); (C-V)$$

V and C are the original voice and carrier which were introduced at the input of the modulator. $(C+V)$ is the original voice band raised in frequency by the frequency of the carrier, and $(C-V)$ is the original voice band reduced by the frequency of the carrier, the latter known as the upper and lower side bands.

As is well known, the lower sideband $(C-V)$ is unintelligible, since the original low frequencies have been converted to high range and high frequencies have been converted to low range.

It is clearly evident that in transmitting this unintelligible sideband $(C-V)$, the original voice V, which, as already shown, appears in the output circuit of the modulator, must be eliminated from the transmission circuit; otherwise intelligence would exist along that circuit.

Heretofore, inventors have taught the art of using balanced modulators, wherein the unintelligible lower sideband $(C-V)$ is produced but the original voice band (V) is balanced out of the output circuit in the well-known Wheatstone bridge arrangement. In my Patent No. 2,206,590, issued July 2, 1940, I taught this method, using the Wheatstone bridge balancing circuit for producing a secret signalling system.

In all such systems using the balanced modulator principle, it is mandatory that the voice (V) be as much as 60 db below the original voice level in order to prohibit intelligence along the transmission circuit. This requires, of course, that the original voice level at the output of the modulator be in the voltage ratio of 1:1000. Since the level of the sideband, itself, is 20 db below the voice; i.e., in the ratio of 1:10, the degree of difference in the volume or magnitude of the original voice and the generated sideband $(C-V)$ is $1000\times10$.

In other words, the accuracy of balance of the modulator must be at least 10,000:1 or 60 db. Such an accuracy of balance is, of course, an extreme criterion to place upon the parameters of a modulator circuit. This is evident, since, the voltages of the circuit, must of necessity, vary due to the source supplying them.

In the foregoing discussion, I have shown that the principle of the balanced modulator, as taught in prior art, is unstable, and therefore, in operation the balanced modulator requires an undue amount of maintenance as well as resulting in an uncertain degree of secrecy in its transmitted product.

In order to overcome the deficiencies of the balanced-modulator circuit, I have invented a new system, wherein the voice is eliminated from the output circuit by means of an electric wave filter. Such wave filters as those shown in U.S. Patent No. 1,227,113, issued to George A. Campbell, May 22, 1917, consist of combinations of inductances and capacitances, no supply voltages and their variations being involved. For this reason, the characteristics of such wave filters are very stable.

It is the fundamental teaching of my present invention, therefore, to use an electric wave filter to eliminate from the output to the transmitting circuit, the original voice signal to the modulator, rather than use a balanced modulator to produce the same result, as taught in prior art.

A further object of my invention is to prohibit re-translation of the unintelligible $(C-V)$ signal by unauthorized parties and extend it into the realm of the impossible. It is an object of my invention to cause this voice band $(C-V)$ to vary continuously in frequency range in a random manner before passing to the transmission circuit. By this means, re-translation of this band $(C-V)$ is impossible except by a demodulating oscillator varying in exact synchronism with the modulating oscillator.

With the foregoing objects and others in view, the invention will be more fully described hereinafter, and will be more particularly pointed out in the claims appended hereto.

In the drawings, like symbols refer to like or corresponding components throughout the several views.

Figure 3:
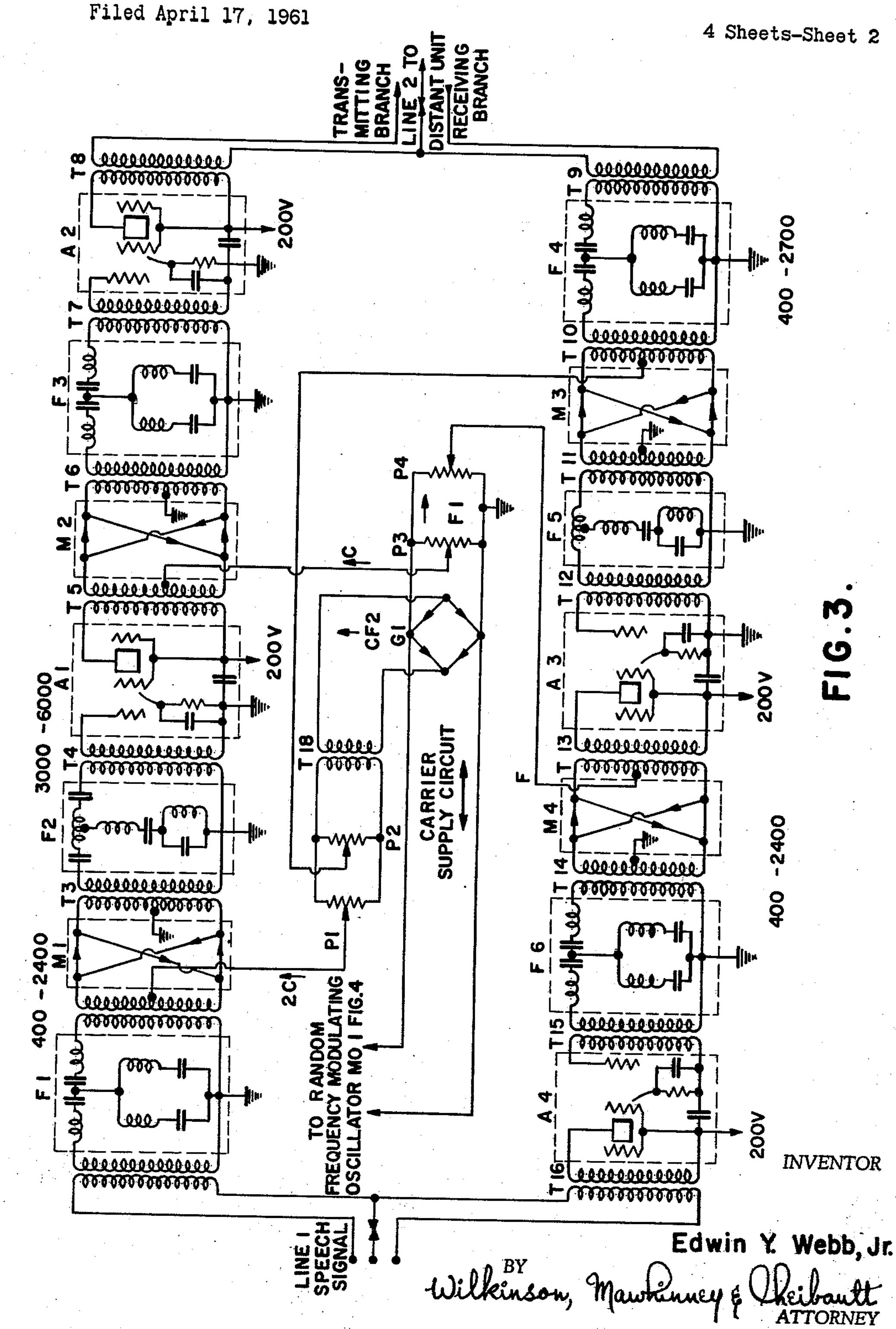
FIGURE 3 is a schematic view of a transmitting and receiving circuit constructed in accordance with the present invention, T1 to T16 indicating the several transformers of the system.

FIGURE 3 is the circuit of my invention, using a system of double modulation. In modulator M1 the voice band V is combined with the modulating carrier 2C to produce the upper and lower sidebands $(2C+V)$ and $(2C-V)$. The output of the modulator M1 is connected to the band-pass filter F2, and it is this filter which eliminates the voice band V from the remaining circuit. Assuming this modulating carrier 2C to be 6,000 cycles per second, the voice band V is then raised in frequency level by 6,000 cycles or $(2C+V)$ as well as lowered by this amount or $(2C-V)$. The filter F2 being of the band-pass type, will pass frequencies between 3,000 and 6,000 cycles per second but not those below. It is by means of this filter, therefore, that the original voice band V as well as the upper sideband $(2C+V)$ and the carrier 2C have been eliminated from the transmission circuit.

The only product of modulation appearing at the output of the filter F2 is $(2C-V)$ which is the inverted voice band raised in frequency level by the amount of the modulating carrier 2C. It is evident that such a voice band is unintelligible but at this frequency level (6,000) it cannot be accepted by the normal telephone circuit. It is because of this that a second stage of modulation is required. It is one purpose of my invention to use this second stage.

Figures 1, 2:
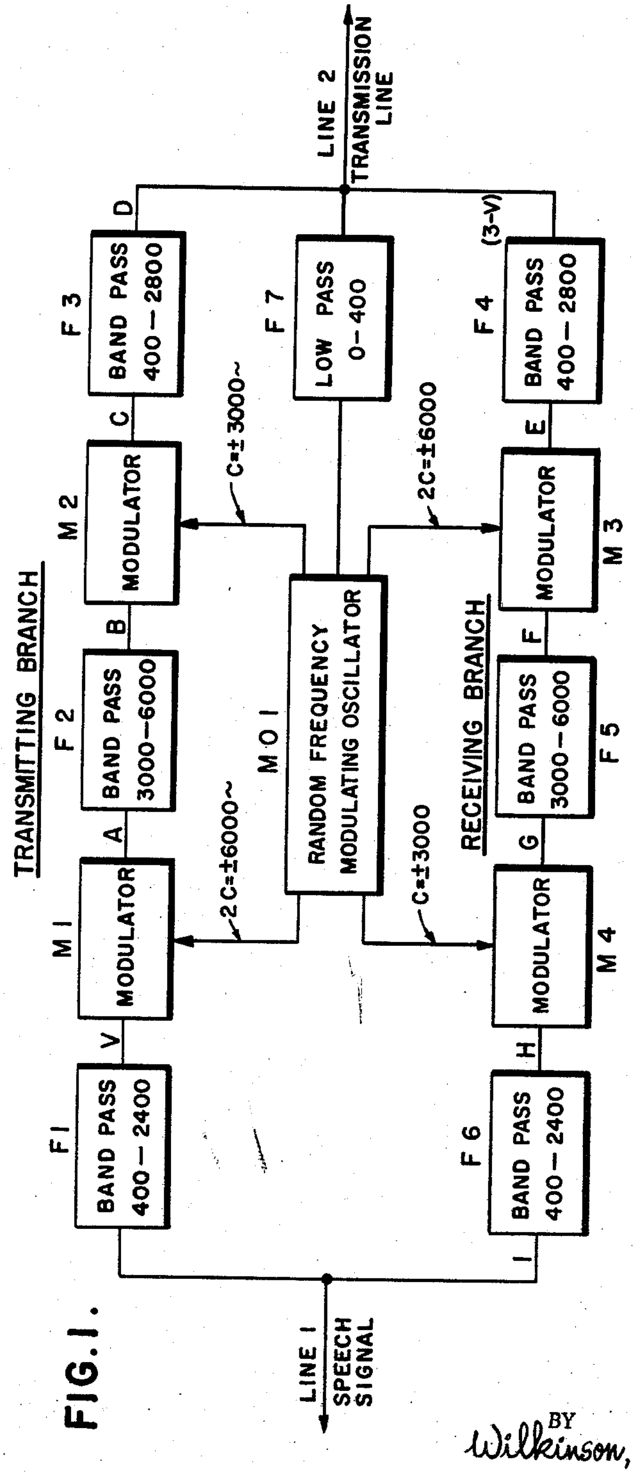
FIGURE 1 is a block diagram of the schematic circuit of FIGURE 3.
FIGURE 2 is a frequency table showing the frequency translations at specific points occurring in transmitting and receiving on a secrecy system constructed in accordance with the present invention.

Referring to FIGURE 3, it will be seen that the lower sideband ($2C-V$) after passing through the band-pass filter F2, is amplified by amplifier A1 and then fed into modulator M2 where it meets a second carrier C. This carrier frequency C is exactly half that of 2C and it is another purpose of this invention to show that the carrier C is the fundamental frequency of which 2C is the second harmonic thereby requiring only a single modulating oscillator MO1, shown in FIGURES 1 and 4. This single oscillator generating C and 2C, is used for the double modulating system in both the transmitting branch and the receiving branch of the secret signalling apparatus of my invention, as shown in FIGURE 1.

After the band ($2C-V$) is modulated with C, one of the generated products is ($C-V$) which is the lower sideband and is, of course, unintelligible. It is readily seen that this unintelligible band lies in the same frequency range as the original voice band V and is, therefore, transmissible over any normal voice circuit, either wire or radio.

At this point in my invention I have used the art of creating a sideband of the voice, raising it above the lower cut-off range of an audio frequency band-pass filter F2 (FIGS. 1 and 3) in order to eliminate the voice V; then modulating this band with a second carrier, C, at M2, in order to produce an unintelligible band ($C-V$), having the same frequency range as the original voice band, V.

If this unintelligible band ($C-V$) is delivered to the voice circuit and transmitted to the distant end, it is beyond the ability of the ordinary eavesdropper to re-translate it.

In my Patent No. 2,315,567, issued April 6, 1943, I caused the transmitted band ($C-V$) to vary or "Wobble" by shifting the frequency of the modulating oscillator and then transmitting this shifting frequency to the distant end of the circuit for demodulating the shifting band ($C-V$) upon its arrival. In my present invention I improve that method taught in my previous patents by not passing to the transmission circuit the frequency of the modulating oscillator in any form whatsoever.

Figure 4:
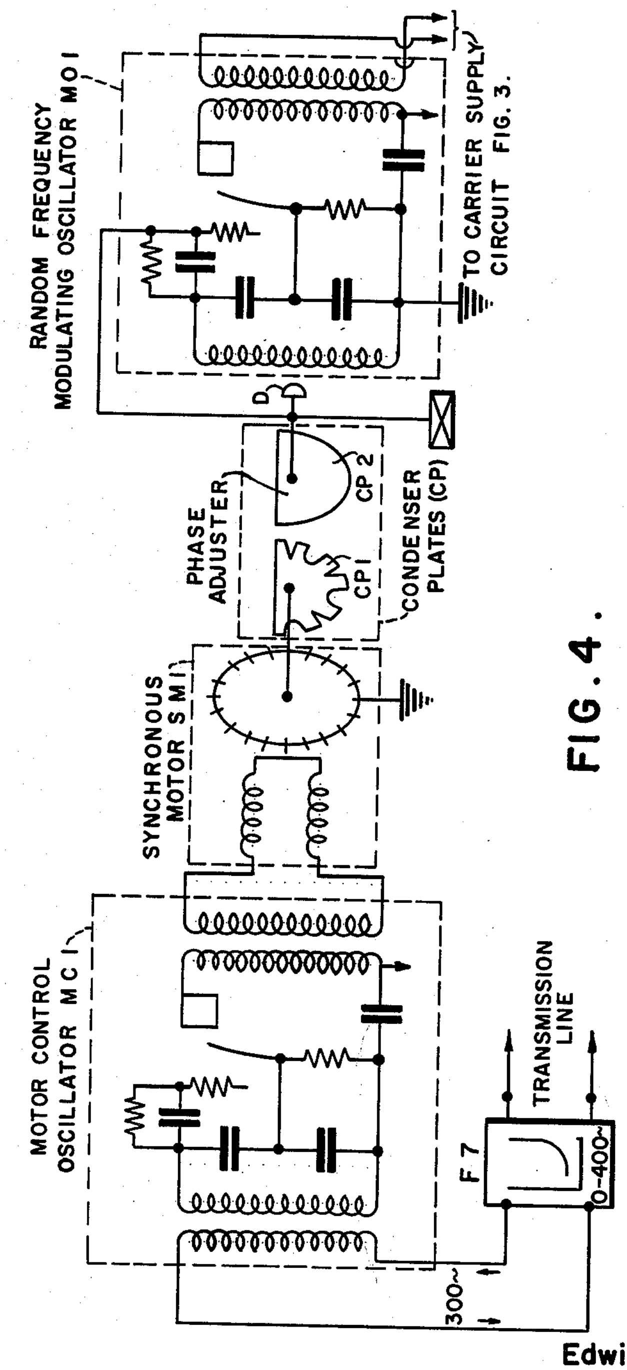
FIGURE 4 is a schematic view of the random frequency modulating oscillator circuitry employed with a transmitter and receiver system constructed in accordance with the present invention.
Figure 6:
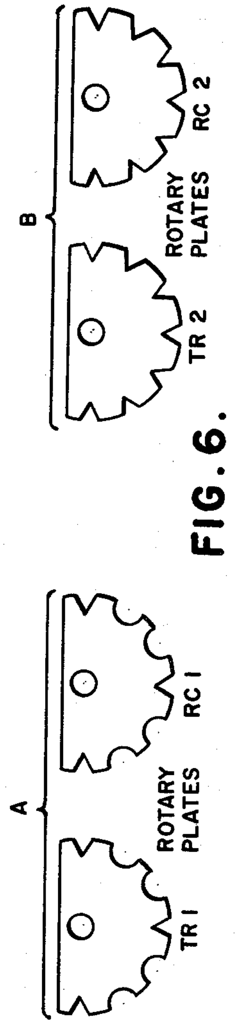
FIGURE 6A is a plan view of identical transmitter and receiver condenser plates constructed in accordance with the present invention as shown in FIGURE 4 and FIGURE 5.
FIGURE 6B is a modified form of rotary condenser plates employed in the present invention.

The method for accomplishing this is shown in FIGURE 4. The motor control oscillator MC1 may be of a 300 cycle per second frequency, which generates currents driving synchronous motor SM1, which in turn rotates condenser plate CP1. This condenser plate CP1 is of an irregular shape as shown in FIGURES 6A and 6B, so that its capacitance characteristic becomes irregular as it rotates adjacent to the fixed plate CP2 or phase adjuster plate, as shown in this figure. This fixed condenser plate CP2 is connected to the grid of the modulating oscillator M1.

In FIGURE 6A a pair of rotary condenser plates is illustrated, one for the transmitting terminal and one for the receiving terminal of the secrecy circuit. It is obvious that both plates must be provided with identical contours. These, of course, are to be varied, but whatever variance is employed, both plates must be identical.

The plates shown in FIGURE 6B do not employ semicircular cut-outs but employ notched cut-outs. Since the area of the condenser plate is a factor in its capacitance and since any change in the plate area will cause a variance in capacitance, both the transmitter and receiver will receive the same change simultaneously and hence the plates may partake of numerous variations as long as they are identical.

As this plate CP1 rotates, the frequency of the modulating oscillator MO1 is made to vary around its base frequency, which, as stated, may be 3,000 cycles per second. In this manner the base frequency is caused to swing in a random and irregular manner to 2,900 or 3,100 cycles per second, or to any other preselected value. Since this varying modulating frequency is filtered from the transmitted sideband ($C-V$), it cannot appear on the transmission circuit and therefore cannot be obtained by an eavesdropper for demodulation .

It is evident, therefore, that the shifting band ($C-V$), which is passed to the transmission circuit, can be restored to intelligible speech at the receiving end only by demodulating it with a second carrier varying in exact synchronism with that at the transmitting end.

Figure 5:
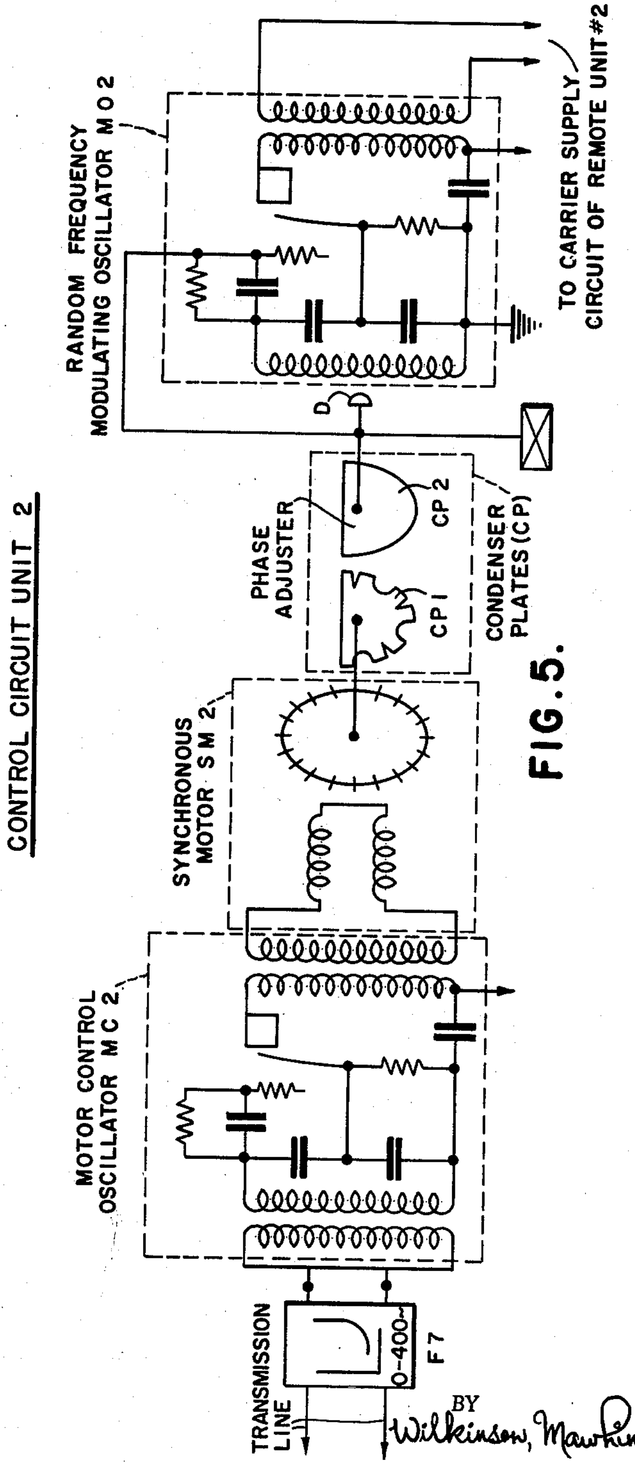
FIGURE 5 is the similar system as FIGURE 4, required at the receiving end of the transmission circuit.

As can be seen in Unit 1 of FIGURE 4, the plate circuit of motor control oscillator #1 drives the synchronous motor #1, which, as stated by way of example, may be at a 300 cycle per second rate. It is evident, also, that this oscillator control frequency passes from the grid circuit to low-pass filter F7 and is then connected to the voice transmission circuit. It is this oscillator frequency that is passed to the distant secret signalling system along with the shifting unintelligible voice band ($C-V$), for synchronizing motor control oscillator, MC2; FIGURE 5.

After passing along the transmission circuit this oscillator current enters the low pass filter F7 of the distant secrecy unit (unit #2) and then enters the grid circuit of its 300 cycle motor control oscillator, MC2. In this maner, the two oscillators, motor control oscillators #1 and #2, although separated, are made to lock in frequency, thereby remaining in exact synchronism. They do not have to remain on an exact frequency, for if one varies, the other will, also, both motors thereby remaining in exact synchronism of rotation. This change or variation in frequency of the oscillators can be done purposely if desired.

It is evident, of course, that in the manner described, the 2 synchronous control motors MC1 and MC2 are made to remain in exact synchronism and thereby, in rotating identical condenser plates CP1, the shifting demodulating frequency is held in exact synchronism with that of the modulating frequency at the transmitting end.

As already stated, the irregularly cut rotary plates on each of the 2 motors must be identical. They can be changed at will, new ones replacing used ones which may then be destroyed. If only 2 plates are made, it will be impossible for any other secrecy apparatus, even of similar design or make, to demodulate the shifting speech band ($C-V$).

It is evident that the shifting modulating oscillator MO1 must remain in exact phase relationship with that of the demodulating oscillator MO2 at the receiving end for, otherwise, one might swing from 3,100 cycles per second to 2,900 cycles per second while the other changed from 2,900 cycles per second to 3,100 cycles per second. It is within the scope of this invention to produce the means for maintaining this phase relationship. As can be seen in FIGURE 4 and FIGURE 5, the stator plate CP2, or phase adjuster, is manually adjustable at D so that its position of rotation can be brought to exact space relationship with that of the similar stator plate of the distant unit #2. By this adjustment, once connection is established between two or more secrecy devices and the motors are in synchronism, proper phase and frequency relationship between the modulating oscillators is obtained.

It is evident that no other apparatus without exact condenser plates CP1, can be synchronized with the shifting voice band ($C-V$) on the transmission circuit. No carrier appears on the circuit as it has been eliminated and no sideband appears except with speech itself so there is no fixed frequency with which to synchronize.

Although I have disclosed herein the best form of the invention known to me at this time, I reserve the right to modifications and changes as may come within the scope of the following claims.

What I claim is:

1. The method of transforming normal speech into unintelligible signals for transmission over radio or telephone circuits which consists of subjecting the voice input to a first band pass filter, modulating the filtered signal with a random frequency carrier, subjecting the modulated signal to a second band pass filtering operation, modulating the band pass filtered signal with a second random frequency carrier of a frequency exactly one-half that of the first modulation operation and subjecting the second modulation signal to a third low pass filtering action to produce a shifting inverted band of the original speech signal within the original speech band but unintelligible.

2. A secrecy modulating system comprising means for accepting a local speech signal, a first band pass filter means in circuit with said local signal, a first modulation means in circuit with the signal from said first band pass filter, means for modulating a shifting carrier signal therewith, a variable capacitance control oscillator controlling the frequency of said modulation means, a band pass filter means in circuit with the signal from said first modulator means, a second modulation means in circuit with the signal of said band pass filter means for modulating a second shifting carrier signal therewith, and a band pass filter means in circuit with the signal of said second modulation means to produce an inverted shifting band of the original speech signal within the original speech band.

3. A secrecy modulating system as claimed in claim 2 further comprising means in circuit with said second modulation means for subjecting said second modulation means to a signal of one-half that of said first modulation means.

4. A secrecy modulating system as claimed in claim 2 wherein said first band pass filter means has a range from 400 to 2,400 cycles.

5. A secrecy modulating system as claimed in claim 2 wherein said band pass filter has a frequency range from 3 kc. to 6 kc.

6. A secrecy modulating system as claimed in claim 2 wherein said third band pass filter means has a wider filter range than the first band pass filter means.

7. A secrecy modulating system as claimed in claim 2 wherein said first modulation means is of the order of 6,000 cycles per second.

8. A secrecy modulating system as claimed in claim 2 wherein said second modulation frequency is the fundamental frequency of the said first modulation means.

9. The method of transforming normal speech into unintelligible signals for transmission over radio or wire circuits which comprises filtering the voice signal, modulating the filtered voice signal with varying frequencies, inverting the modulated signal, filtering and passing the shifting signal to the transmission circuit, receiving the unintelligible transmitted signal, filtering and reinverting the filtered signal, demodulating the reinverted filtered signal with varying frequencies and filtering the demodulated signal to obtain the original intelligible voice signal at the receiving end of the circuit.

10. The method of claim 9 wherein the transmitted and received shifting voice bands are electrically locked in synchronism and wherein the synchronizing means is carried on the same transmission line.

References Cited in the file of this patent

UNITED STATES PATENTS

| | | |
|---|---|---|
| 1,821,997 | Wintringham | Sept. 8, 1931 |
| 2,395,431 | Sprague | Feb. 26, 1946 |
| 2,395,432 | Sprague | Feb. 26, 1946 |
| 2,411,206 | Guanella | Nov. 19, 1946 |

FOREIGN PATENTS

| | | |
|---|---|---|
| 352,095 | Great Britain | July 9, 1931 |